Patented Jan. 16, 1945

2,367,415

UNITED STATES PATENT OFFICE 2,367,415

METHOD OF TREATING STICK-WATER

William Martin, Vancouver, British Columbia, Canada

No Drawing. Application March 23, 1942, Serial No. 435,879

7 Claims. (Cl. 71—16)

This invention relates to a method of treating stick-water and the product formed thereby.

Stick-water is the common name applied to the liquid and the solids suspended therein which are pressed out of fish in the manufacture of fish-meal. For many years stick-water was discarded as useless. Then it was found to contain valuable proteids but until now it has been very difficult and extremely expensive to separate the water from the other constituents of the stick-water without spoiling said other constituents.

An object of the present invention is the provision of a simple and inexpensive method of treating stick-water to remove the other constituents from the water thereof.

Another object is the provision of a method of removing the other constituents from the water of stick-water without spoiling said other constituents for further use.

A further object is the provision of a valuable animal food by treating stick-water.

A still further object is the provision of a good fertilizer by treating stick-water.

With these and other objects in view, the present invention consists essentially of the method of treating stick water which comprises adding a soluble substance to stick-water to increase the specific gravity of the water thereof, allowing the stick-water to stand until the other constituents thereof rise to the top of the water, and removing the other constituents from the top of the water.

When the specific gravity of the water is increased in this manner, the other constituents of the stick-water rise to the top of the water. These constituents are small solid particles of fish, a jelly-like mass, and some oil. It is then very easy to remove the other constituents from the top of the water. It is preferable to saturate the water with the soluble substance in order to obtain a more complete separation.

Sodium chloride or common salt has been found to be a very suitable substance for this purpose. The salt is added to the stick-water until the latter will not absorb any more. Some salt remains in the constituents separated from the water but this is not harmful but, if desired, a large proportion of it may be washed out with a relatively small quantity of fresh water. It is possible to press out a large percentage of this additional water. The separated constituents, either alone or mixed with other ingredients, make a very good food for animals.

Sulphate of ammonia may be used to increase the specific gravity of the water. This substance works satisfactorily and the removed constituents may be used as a fertilizer, in which case any sulphate of ammonia remaining therein is beneficial.

The constituents may be removed from the top of the water in any suitable manner. It is preferred, however, to cool the stick-water, either during the time the other constituents are rising to the top of the water or after they have so risen, until the mass on top of the water jells. When in this state, the jelled mass may be lifted off the water. In this way, practically all the other constituents are separated from the water. The jelly-like mass which is in stick-water may be separated in this manner whereas it is practically impossible to remove it in any other way. This jelly-like mass is very rich in proteids.

It is desirable to dry the materials after they are separated from the water. This may be done merely by means of heat but it is preferable to mix the materials with substantially dry peat, preferably finely ground, before applying the heat. This spreads the materials over a very large surface area so that the heat may come into direct contact with a larger proportion thereof.

It has been found that mixing and pressing the peat and the materials together in a moist state produces a very intimate union. This removes a large amount of moisture before the heating and it is very beneficial when the finished product is to be used as a fertilizer since the solids from the stick-water are pressed into the peat fibre. The fish material in the peat causes the latter to rot much more rapidly than it otherwise would. This makes the nitrogen of the peat more readily available for the soil.

From the above it will readily be seen that a simple, inexpensive and very effective method has been provided for treating stick-water to remove the other constituents from the water thereof without spoiling said constituents for further use as animal food or fertilizer.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

What I claim as my invention is:

1. The method of treating stick-water which comprises adding sufficient sodium chloride to stick-water to saturate the water thereof and increase the specific gravity of said water, cooling the stick-water until the other constituents thereof jell on top of the water, and removing the jelled mass from the water.

2. The method of treating stick-water which comprises adding sulphate of ammonia to stick-water to increase the specific gravity of the water thereof, allowing the stick water to stand until the other constituents thereof rise to the top of the water, cooling the stick-water until the mass on top of the heavier water jells, and removing the other constituents from the top of the water.

3. The method of treating stick-water which comprises adding sufficient sulphate of ammonia to stick-water to saturate the water thereof and increase the specific gravity of said water, cooling the stick-water until the other constituents thereof jell on top of the water, and removing the jelled mass from the water.

4. The method of treating stick-water which comprises producing a substantial increase in the specific gravity of the water by adding thereto a soluble salt selected from the group consisting of sodium chloride and sulphate of ammonia in sufficient quantity to produce a substantially saturated solution, and then removing the constituents which float to the top of the water.

5. The method as claimed in claim 4 in which the stick-water is cooled, until the mass on the top of the water jells.

6. The method as claimed in claim 4 in which the constituents removed from the top of the water are mixed with substantially dry peat.

7. The method as claimed in claim 4 in which the soluble salt used is sulphate of ammonia.

WILLIAM MARTIN.